Oct. 31, 1967  D. D. PENMAN  3,349,807
PROCESS OF LIMITING RIPPING OF HIGH PRESSURE COMPRESSIBLE
FLUID CONDUIT AND MEANS THEREFOR
Filed May 28, 1965

INVENTOR.
DEXTER D. PENMAN
BY
Noel T. Conway
ATTORNEY

3,349,807
PROCESS OF LIMITING RIPPING OF HIGH PRESSURE COMPRESSIBLE FLUID CONDUIT AND MEANS THEREFOR
Dexter D. Penman, 9091 Orangewood,
Garden Grove, Calif. 92641
Filed May 28, 1965, Ser. No. 465,820
4 Claims. (Cl. 138—172)

This invention relates generally to high pressure compressible fluid conduits and, more particularly, to a process for limiting or stopping rips which sometimes form in such conduits.

This invention further relates to means for limiting the extent to which high pressure compressible fluid conduits may rip should a crack form in the conduit.

Modern industry uses vast quantities of natural gas every day. This natural gas is usually piped from the gas fields where it is removed from the ground to the cities where it is distributed to the various places where it is used through conduits above and below the ground.

To eliminate the inhertnt costs of larger or a greater number conduits the gas is normally transported through conduits at some high pressure, for example 250 p.s.i. Thereby, smaller conduits are able to carry the required quantities of gas without excessive flow velocity.

When designing these high pressure conduits, the engineer desires to make the walls of the conduit as light as possible to reduce the cost. Therefore, the conduits are designed with the assumption that the stresses induced by the pressure of the gas within the conduit are evenly distributed with an appropriate safety factor to tend to insure that no rip occurs. However, a serious problem arises if a small rip or tear should occur within a conduit carrying such compressible fluids because the stresses induced by the pressurized gas will concentrate at the end of the rip as it tears. This stress concentration depending upon material of conduit may be as much as 50 to 100 times the normal stress induced by the gas pressure. Since it is not economically feasible for an engineer to design into a conduit a safety factor of 50 to 100 a pipe wall continues to rip or split until the pressure becomes low enough that the conduit is able to withstand the stress concentration at the end of the rip.

In the case of conduit carrying incompressible fluid such as water the above problem is not very important because the pressure drops off quite rapidly when a relatively small opening first forms. However, in the case of compressible fluids a considerably longer period of time elapses before the pressure drops. This is because even though gas may be released through a split, the rest of the gas within the pipe expands and tends to maintain the high pressure. This can cause hundreds of feet of pipe, and in some cases miles of pipe, to be literally ripped open with explosive force. If such pipe were located below the streets of a city, such results would not only be expensive to repair, but dangerous if not disastrous.

Merely providing enlarged portions such as flanges on the conduits at spaced intervals will not stop the rip. This is because the flange is part of the conduit and as the end of the rip moves along the conduit the rip will form in the flange also, subjecting the flange to the high stress concentration. It would be economically unfeasible to provide flanges which have lateral dimensions 50 to 100 times the thickness of the conduit.

With the foregoing in mind it is an object of this invention to provide a process for limiting the extent to which the compressible fluid conduit may rip if a tear should form therein.

It is a further object of this invention to provide a means for limiting the extent to which rips in a compressible fluid conduit may form.

Still another object of this invention is to provide means for enabling lightweight conduits to carry compressible fluids more safely.

A still further object of this invention is to provide means which are to be mounted to a pressurized compressible fluid conduit to enable a more economical conduit to carry compressible fluid.

It is a still further object of this invention to provide a process for limiting the extent to which a rip in a high pressure compressible fluid conduit may form including the step of encircling the conduit with a band of material of predetermined cross sectional area sufficient to withstand the forces of the pressure on the conduit which tend to cause the rip to continue, and then tightening that band of material onto the conduit with such tension as to cause the walls of the conduit to be in compression when the fluid wtihin conduit is at the ambient pressure.

Other and further objects of this invention will become apparent in the detailed description below in conjunction with the attached drawings where:

Figure 1:
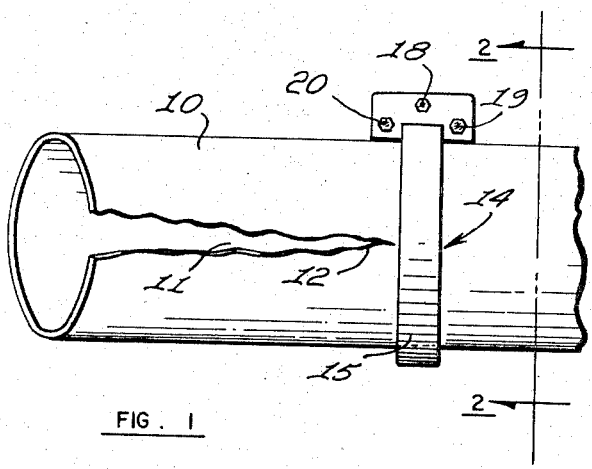
FIG. 1 is a sectional view of a conduit having a rip therein and one embodiment of the present invention for stopping that rip.
Figure 2:
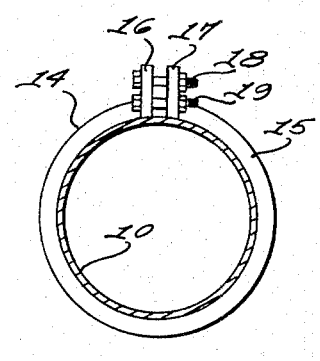
FIG. 2 is a cross sectional view of the conduit along line 2—2.

Referring now to FIG. 1 wherein a conduit 10 is shown which has a rip or split 11 therein extending to the end of the rip at 12. The pipe 10 is normally made of mild steel; however, the material may vary according to the particular application. Also the diameter and wall thickness of the pipe may vary according to the operation requirements.

Located around the conduit 10 is a means for stopping the rip from continuing along the conduit designated generally by the arrow 14. In this embodiment this means takes the form of a steel strap 15 which has a length slightly less than the perimeter of the conduit 10 and has means thereon for tightening the band onto the conduit. In this case the means takes the form of two flanges 16 and 17 formed on the respective ends of the bands which are pulled together by a series of bolts 18, 19, and 20, respectively. In order to counteract any tendency of the band to twist the bolts 19 and 20 are located to either side of the band 15.

A preferred manner of determining the necessary cross section area of the band will be set forth in detail below. Although no certain ratio of band width-to-thickness is critical, the band cannot be too thin since when it performs its function it will be loaded mainly on one edge. Conversely, if the band is very narrow, it will have to be so thick that it will be hard to position, and unstable after it has been positioned. Accordingly, it has been determined that the ratio of width-to-thickness should be 1:9 to 5:1.

There are no exacting requirements of the amount of tension on the band 15. However, the band should be tightened until it induces compressive stresses in the conduit 10 when compressed fluid is in it. Thereby, it will be assured that the band will be tight enough to prevent rip progress, since no tension exists in conduit across rip.

Figure 3:
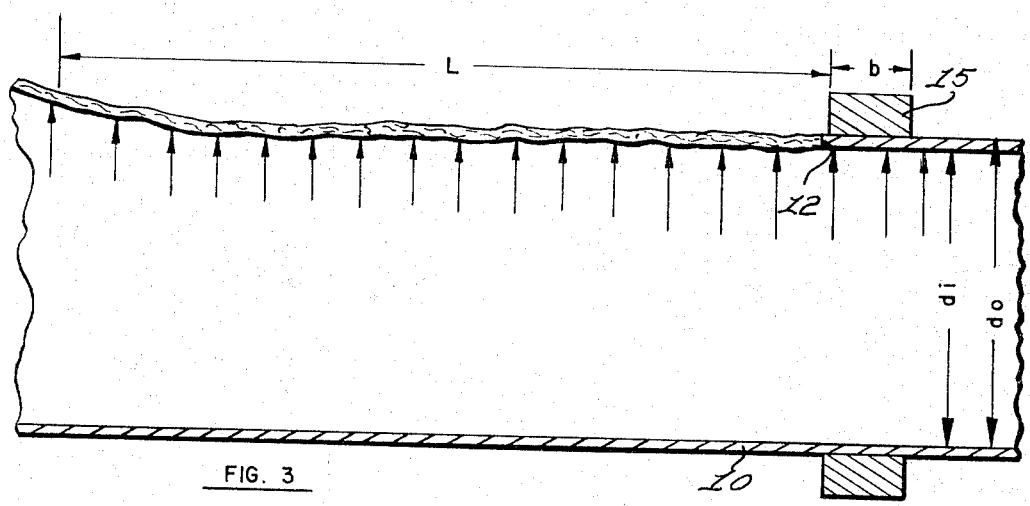
FIG. 3 is a longitudinal cross sectional view of the conduit disclosing how the pressure tends to continue the rip.

In order to illustrate the loads on the band 15 which tend to continue to rip 11, FIG. 3 shows a longitudinal cross sectional view of the conduit 10 at the portion at which the band 15 is located. The band 15 must be strong enough that the band can hold the force trying to extend the rip 11. The tension on the conduit due to the pressure for the width of the band 15 is equal to $$T = \frac{(P)(I.D.)(W)}{2}$$

where:

T = the (tension) on the band in lbs.
P = the gas pressure in pounds per square inch
I.D. = the inside diameter of the conduit in inches
W = the width of the band in inches However, this formula assumes that the particular conduit is continuous on either side of the particular portion of the conduit which is being checked. In the present case at the time the end 12 of the rip 11 reaches the band 15 there are forces, indicated by a series of arrows 21, which are tending to force the walls to either side of the rip 11 of the conduit 10 apart and bend the conduit wall outwardly. Since the rip 11 is located adjacent the band 15 these forces are transferred through the conduit wall to the portion of the wall located within the band 15 and, therefore, transferred to the band 15.

The total amount of forces 21 transferred to the band 15 depends upon several factors. First of all, if the conduit is located in the ground the ground tends to prevent the conduit from expanding outwardly and, therefore, receives some of the forces 21. The amount of force that the ground receives varies according to the type and consistency of the composition around the conduit 10. If the conduit is located in the air, there is nothing to take the forces 21 except the wall rigidity which tends to retain in their round position. Therefore, more of these forces are transferred to the area in which the band 15 is located than when the conduit 10 is in the ground.

A further factor in determining the forces which the band 15 must receive is the thickness of the walls of the conduit 10. If the walls are thicker, they tend to be more rigid along the longitudinal axis, and, therefore, they tend to transfer more forces from the area of the split to the area where the band 15 is located.

In addition to the above consideration, there is the further practical problem that there will not be the same pressure exerted on the conduit wall at all portions along the rip 11 since the pressure tends to drop at a particular point as the end of the rip 11 continues away from that point. In addition, there is the consideration that the gas pressures which are exerted by gases further away from the band 15 are not transferred to the band nearly as much as the force of gas pressures of gas which is closer to the band 15. Therefore, it is practically impossible to compute exactly how much force will be transferred by the gas to the band 15. However, it has been determined that the forces may be computed with sufficient accuracy for practical design purposes by assuming that the force of the full pressure for an assumed length L must be held by the band 15. The exact length of the distance L will vary according to conduit material, diameter of the conduit, wall thickness of the conduit, and the environment as mentioned above. However, it will vary within the range of from 0.5 to 5 times the mean diameter of the conduit wall. Therefore, the cross sectional area of the band of material to accomplish the purposes of the present invention may be determined by the formula $$A = \frac{(I.D.)(L)(P)(S_f)}{2S_u}$$

where:

A = the cross sectional area of the band of material in square inches
I.D. = the inside diameter of the conduit in inches
L = the assumed length in inches
P = design pressure of the fluid within the conduit in p.s.i.
$S_f$ = safety factor
$S_u$ = ultimate strength of the material used in p.s.i.

In order to illustrate the invention further, let it be assumed that the invention is to be used on a 24-inch O.D. pipe having a ¼" wall thickness and 250 p.s.i. fluid within it. Further, let it be assumed that the band 15 is made of a high strength metal having an ultimate strength of 120,000 p.s.i. and it is desired that a safety factor of 4 for static loads be used. In addition, let it be assumed that the pipe is to be used in ordinary ground. In this case, an L factor of 3 times the mean diameter of the pipe wall would give a sufficiently accurate answer. The cross sectional area of the band 15 would be, in accordance with the above mentioned formula:

$$A = \frac{(23.5)(3 \times 23.5)(250)(4)}{2(120,000)}$$
$$= 6.9 \text{ in.}^2$$

A band approximately 3.5 inches wide and 2 inches thick will work satisfactorily in this case. The ratio of the width to the thickness of such a band is about 1.75:1 which produces good results.

Figure 4:
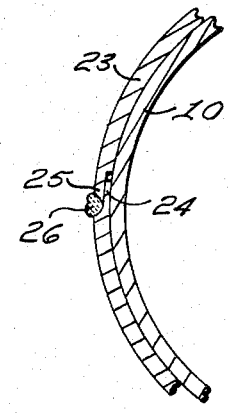
FIG. 4 is a partial view of an alternative means for stopping the rip in the conduit.

FIGURE 4 discloses alternative means for stopping such rips in gas conduits. In this case a metal band 23 is wrapped around the conduit 10 and has a recessed portion 24 at one end thereof with a cooperating overlapping portion 25 located at the opposite end of the band 23. This band is wrapped tightly around the conduit 10 and then is welded at 26 in order to hold the band around the conduit. The weld is performed while the conduit 10 is held and compressed with dies, or jigs, tightening the band 23 onto the conduit. The band is additionally shrunk onto the conduit by the shrinking of the weld as it cools. This method of fabrication puts the conduit in radial compression when the fluid pressure within the conduit is at the ambient pressure.

The recessed portion 24 and the cooperating overlapping 25 are provided in order that the weld 26 may be made without danger of welding the band 23 to the conduit 10. If the weld 26 actually welded the band 23 to the conduit 10 there would be the danger that the rip 11 might hit the welded zone. In such case, the weld would fail in the same manner the conduit 10 would because the weld would be subjected to the high stress concentration at the end of the rip.

Figure 5:
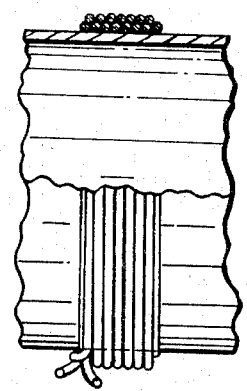
FIG. 5 is a partially cut-away view of annother alterative means for limiting the rip in the conduit.

Another means to accomplish the invention is shown in FIG. 5. In this case, the conduit 10 is wrapped by a wire 27 or a series of wires. The wire 27 is wrapped around the conduit in a stretched condition and, thereby, after the ends of the wire are secured together such as by knot 28. The total cross sectional area of the wire 27 which is the effective cross sectional area of the band of material formed by the wire 27 may also be determined in accordance with the second above formula.

While only a few means to accomplish the invention have been shown and described in detail, it will be apparent to those skilled in the art that such is by way of illustration only and numerous variations may be made without departing from the spirit of the invention. Therefore, it is my intention that my invention should be limited solely by the scope of the appended claims.

I claim:

1. A process of limiting rips in high pressure compressible fluid conduit which carries such fluid at a predetermined pressure, said conduit having a predetermined circumferential tensile strength for each inch of length of conduit, said process including the steps of:

encircling the conduit with a series of bands of material prior to a rip forming in the conduit, said bands being spaced along the conduit at predetermined intervals, each inch of width of each of said bands having a tensile strength greater than said predetermined circumferential tensile strength;

and tightening each band of material onto the conduit sufficiently that when the fluid is within the conduit at said predetermined pressure, each band causes the tensile stresses in the conduit wall in the area engaged by the band to be greatly different from the tensile stresses induced by the fluid in the conduit wall at areas not engaged by the bands.

2. The process set forth in claim 1 wherein each band of material is tightened sufficiently to induce in the conduit wall in the area engaged by the band compressive stresses when the fluid in the conduit is at said predetermined pressure.

3. A process of limiting rips in high pressure compressible fluid conduit which carries such fluid at a predetermined pressure, said conduit having a predetermined circumferential tensile strength for each inch of length of conduit, said process including the steps of:

encircling the conduit with a series of bands of material prior to a rip forming in the conduit, said bands being spaced along the conduit at predetermined intervals, each inch of width of each of said bands having a tensile strength greater than said predetermined circumferential tensile strength;

and tightening each band of material onto the conduit so as to load in tension each band to a tension, in pounds, at least equal to $$\frac{(I.D.)(P)(W)}{2}$$

where:

I.D. = inside diameter of conduit, in inches
P = the predetermined pressure of fluid the conduit is to carry in pounds per square inch
W = width of band, in inches.

4. A process of limiting rips in high pressure compressible fluid conduit which carries such fluid at a predetermined pressure, said conduit having a predetermined circumferential tensile strength for each inch of length of conduit, said process including steps of:

encircling the conduit with a series of bands of material prior to a rip forming in the conduit, said bands being spaced along the conduit at predetermined intervals, each inch of width of each of said bands having a tensile strength greater than said predetermined circumferential tensile strength;

and tightening each band of material onto the conduit so as to load each band to a tension determined according to formula including as factors the inside diameter of the conduit, the predetermined pressure of fluid the conduit is to carry, and the width of the band.

References Cited
UNITED STATES PATENTS

| | | | |
|---|---|---|---|
| 158,554 | 1/1875 | Whitcomb | 138—99 |
| 848,139 | 3/1907 | Stuppar | 138—99 |
| 1,242,060 | 10/1917 | Smakal | 138—99 |
| 1,763,360 | 6/1930 | Kean | 138—150 |
| 1,788,505 | 1/1931 | Beard | 24—281 |
| 2,213,022 | 8/1940 | Stuffer | 138—99 |
| 2,425,800 | 8/1947 | Hamilton | 72—466 |
| 2,599,882 | 6/1952 | Adams | 33—181 |
| 2,916,308 | 12/1959 | Voldrich et al. | 285—45 |

LAVERNE D. GEIGER, *Primary Examiner.*

B. E. KILE, *Assistant Examiner.*